(12) United States Patent
Brandys et al.

(10) Patent No.: US 8,903,178 B2
(45) Date of Patent: *Dec. 2, 2014

(54) ADJUSTING APPLICATION PROPERTIES

(71) Applicant: International Business Machines Corporation, Armonk, NY (US)

(72) Inventors: Szymon Brandys, Cracow (PL);
Malgorzata Janczarska, Cracow (PL);
Pawel Pogorzelski, Cracow (PL);
Tomasz Zarna, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/667,416

(22) Filed: Nov. 2, 2012

(65) Prior Publication Data

US 2014/0126828 A1 May 8, 2014

(51) Int. Cl.
*G06K 9/46* (2006.01)
(52) U.S. Cl.
USPC .......................................... 382/201; 382/181
(58) Field of Classification Search
USPC .......................................... 382/190, 201, 231
See application file for complete search history.

(56) References Cited

U.S. PATENT DOCUMENTS

| 5,832,505 | A | 11/1998 | Kasso et al. |
| 7,636,897 | B2 | 12/2009 | Koralski et al. |
| 7,779,367 | B2* | 8/2010 | Oshiro et al. ................. 715/815 |
| 7,873,965 | B2 | 1/2011 | Hayton et al. |
| 8,095,883 | B2 | 1/2012 | Best et al. |
| 2003/0142138 | A1 | 7/2003 | Brown et al. |
| 2010/0011301 | A1* | 1/2010 | Binyamin ..................... 715/748 |
| 2010/0235769 | A1 | 9/2010 | Young et al. |

FOREIGN PATENT DOCUMENTS

WO 2011/134795 11/2011

\* cited by examiner

*Primary Examiner* — Edward Park
(74) *Attorney, Agent, or Firm* — Holland & Knight LLP; Brian J. Colandreo, Esq.; Jeffrey T. Placker, Esq.

(57) ABSTRACT

A method, computer program product, and computer system for identifying a first reference point on a display. A second reference point of an object of an application is identified, wherein the object is on the display. A distance is determined of the first reference point on the display from the second reference point of the object on the display. One or more properties of the application is adjusted based upon, at least in part, the distance of the first reference point on the display from the second reference point of the object on the display.

14 Claims, 9 Drawing Sheets

ADJUSTING APPLICATION PROPERTIES

TECHNICAL FIELD

This disclosure relates to adjusting application properties systems.

BACKGROUND

Generally, computing systems may allow a user to control application properties, such as, e.g., process priority (e.g., CPU and memory allocation), network bandwidth, audio/video volume, etc. For example, the user may desire to watch a video and run an anti-virus scan at the same time; however, the computing system may not have enough system resources to run both at the same time without incurring, e.g., buffering delays while viewing the video. To avoid such buffering delays, the user may adjust application properties such that the video is assigned more system resources than running the anti-virus scan. This may result in the anti-virus scan taking longer, but the video may run smoother.

While the computing systems may allow the user to control application properties, the control is typically accomplished independently for each application through multiple individual user interfaces. Using multiple individual user interfaces to control application properties may be cumbersome and onerous to the user. As a result, the user may be dissuaded from even attempting to control the application properties.

SUMMARY OF DISCLOSURE

In one implementation, a method, performed by one or more computing devices, comprises identifying, by a processor, a first reference point on a display. A second reference point of an object of an application is identified, wherein the object is on the display. A distance is determined of the first reference point on the display from the second reference point of the object on the display. One or more properties of the application is adjusted based upon, at least in part, the distance of the first reference point on the display from the second reference point of the object on the display.

One or more of the following features may be included. The one or more adjusted properties of the application may include at least one of system resources and network resources. Determining the distance of the first reference point on the display from the second reference point of the object on the display may include identifying a metric for use when determining the distance of the first reference point on the display from the second reference point of the object on the display. The metric may include at least one of a Euclidian distance, a virtual distance, a size of the object, a z-axis of the object, and a visibility of the object. The first reference point may include another object on the display. The display may include at least a primary display and secondary display, and wherein determining the distance of the first reference point on the display from the second reference point of the object on the display may include identifying whether the object is on one of the primary display and the secondary display. The one or more properties of the application may be isolated based upon, at least in part, identifying that the object is on the secondary display.

In another implementation, a computer program product resides on a computer readable storage medium that has a plurality of instructions stored on it. When executed by a processor, the instructions cause the processor to perform operations comprising identifying a first reference point on a display. A second reference point of an object of an application is identified, wherein the object is on the display. A distance is determined of the first reference point on the display from the second reference point of the object on the display. One or more properties of the application is adjusted based upon, at least in part, the distance of the first reference point on the display from the second reference point of the object on the display.

One or more of the following features may be included. The one or more adjusted properties of the application may include at least one of system resources and network resources. Determining the distance of the first reference point on the display from the second reference point of the object on the display may include identifying a metric for use when determining the distance of the first reference point on the display from the second reference point of the object on the display. The metric may include at least one of a Euclidian distance, a virtual distance, a size of the object, a z-axis of the object, and a visibility of the object. The first reference point may include another object on the display. The display may include at least a primary display and secondary display, and wherein determining the distance of the first reference point on the display from the second reference point of the object on the display may include identifying whether the object is on one of the primary display and the secondary display. The operations may further comprise isolating the one or more properties of the application based upon, at least in part, identifying that the object is on the secondary display.

In another implementation, a computing system includes a processor and a memory configured to perform operations comprising identifying a first reference point on a display. A second reference point of an object of an application is identified, wherein the object is on the display. A distance is determined of the first reference point on the display from the second reference point of the object on the display. One or more properties of the application is adjusted based upon, at least in part, the distance of the first reference point on the display from the second reference point of the object on the display.

One or more of the following features may be included. The one or more adjusted properties of the application may include at least one of system resources and network resources. Determining the distance of the first reference point on the display from the second reference point of the object on the display may include identifying a metric for use when determining the distance of the first reference point on the display from the second reference point of the object on the display. The metric may include at least one of a Euclidian distance, a virtual distance, a size of the object, a z-axis of the object, and a visibility of the object. The first reference point may include another object on the display. The display may include at least a primary display and secondary display, and wherein determining the distance of the first reference point on the display from the second reference point of the object on the display may include identifying whether the object is on one of the primary display and the secondary display. The operations may further comprise isolating the one or more properties of the application based upon, at least in part, identifying that the object is on the secondary display.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF ONE OR MORE EMBODIMENTS

Figure 1:
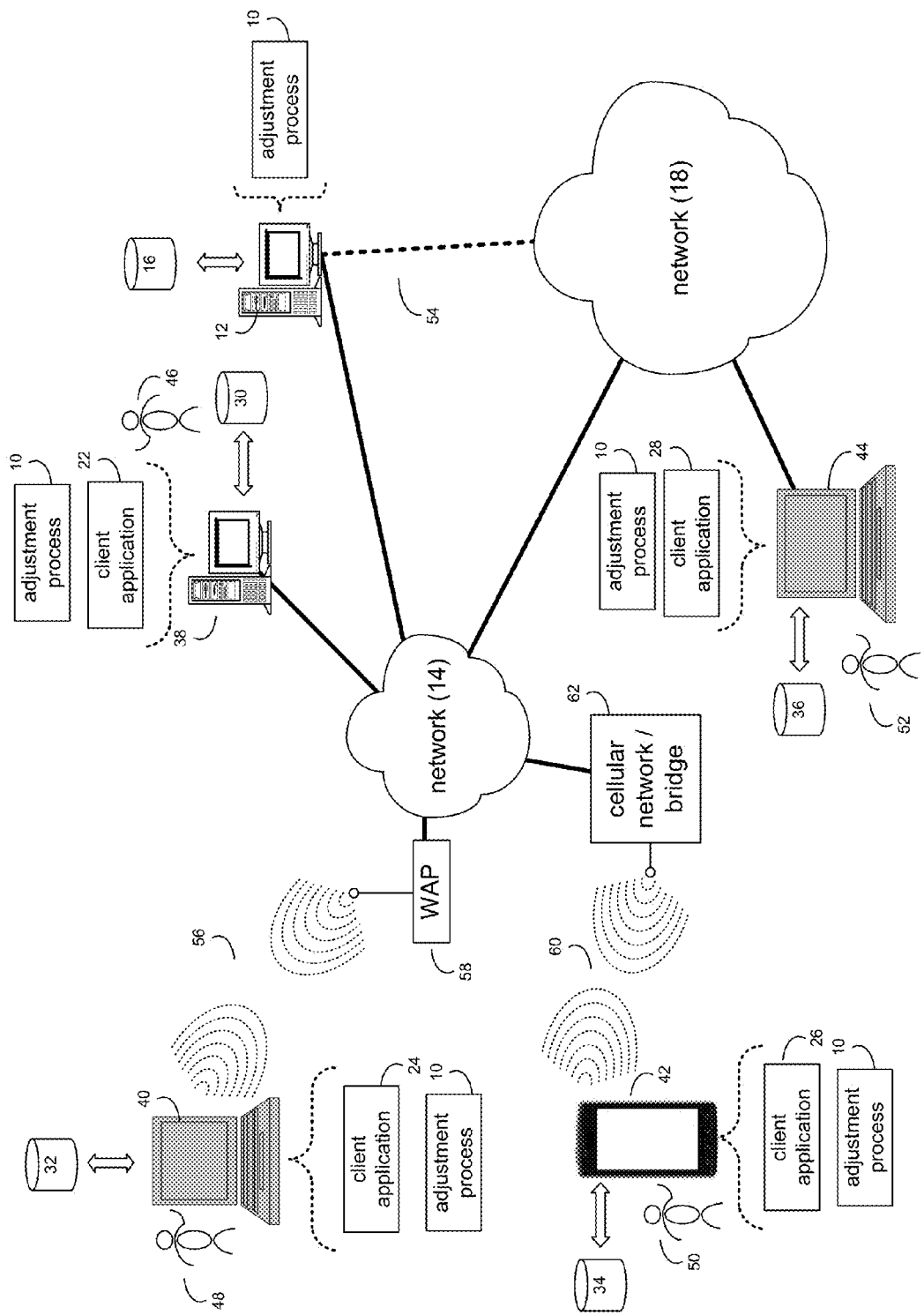
FIG. 1 is an illustrative diagrammatic view of an adjustment process coupled to a distributed computing network according to one or more embodiments of the present disclosure.

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various embodiments of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown adjustment process 10 that may reside on and may be executed by a computer (e.g., client computer 12), which may be connected to a network (e.g., network 14) (e.g., the internet or a local area network). Examples of client computer 12 may include, but are not limited to, a personal computer(s), a laptop computer(s), mobile computing device(s), a server computer, a series of server computers, a mainframe computer(s), or a computing cloud(s). Client computer 12 may execute an operating system, for example, but not limited to Microsoft® Windows®; Mac® OS X®; Red Hat® Linux®, or a custom operating system, for example. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, adjustment process 10 may identify, e.g., by a processor, a first reference point on a display. A second reference point of an object of an application may be identified, wherein the object may be on the display. A distance may be determined of the first reference point on the display from the second reference point of the object on the display. One or more properties of the application may be adjusted based upon, at least in part, the distance of the first reference point on the display from the second reference point of the object on the display.

The instruction sets and subroutines of adjustment process 10, which may be stored on storage device 16 coupled to client computer 12, may be executed by one or more processors (not shown) and one or more memory architectures (not shown) included within client computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Adjustment process 10 may be accessed via client applications 22, 24, 26, 28. Adjustment process 10 may be a stand alone application, or may be an applet/application/script that may interact with and/or be executed within client applications 22, 24, 26, 28. Examples of client applications 22, 24, 26, 28 may include but are not limited to a system and network management application, an anti-virus application, a media player application, a web conferencing application, video conferencing application, voice-over-IP application, or other application that allow for virtual meeting and/or remote collaboration, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (e.g., smart television) (not shown), and a dedicated network device (not shown). Client electronic devices 38, 40, 42, 44 may each execute an operating system, examples of which may include but are not limited to Android™, Apple® iOS®, Mac® OS X®; Red Hat® Linux®, or a custom operating system.

One or more of client applications 22, 24, 26, 28 may be configured to effectuate some or all of the functionality of adjustment process 10 (and vice versa). Accordingly, adjustment process 10 may be a purely server-side application, a purely client-side application, or a hybrid server-side/client-side application that is cooperatively executed by one or more of client applications 22, 24, 26, 28 and adjustment process 10.

Users 46, 48, 50, 52 may access client computer 12 and adjustment process 10 directly through network 14 or through secondary network 18. Further, client computer 12 may be connected to network 14 through secondary network 18, as illustrated with phantom link line 54. Adjustment process 10 may include one or more user interfaces, such as browsers and textual or graphical user interfaces, through which users 46, 48, 50, 52 may access adjustment process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows, e.g., mobile phones, computers, smart phones, and other electronic devices to be interconnected using a short-range wireless connection.

Figure 2:
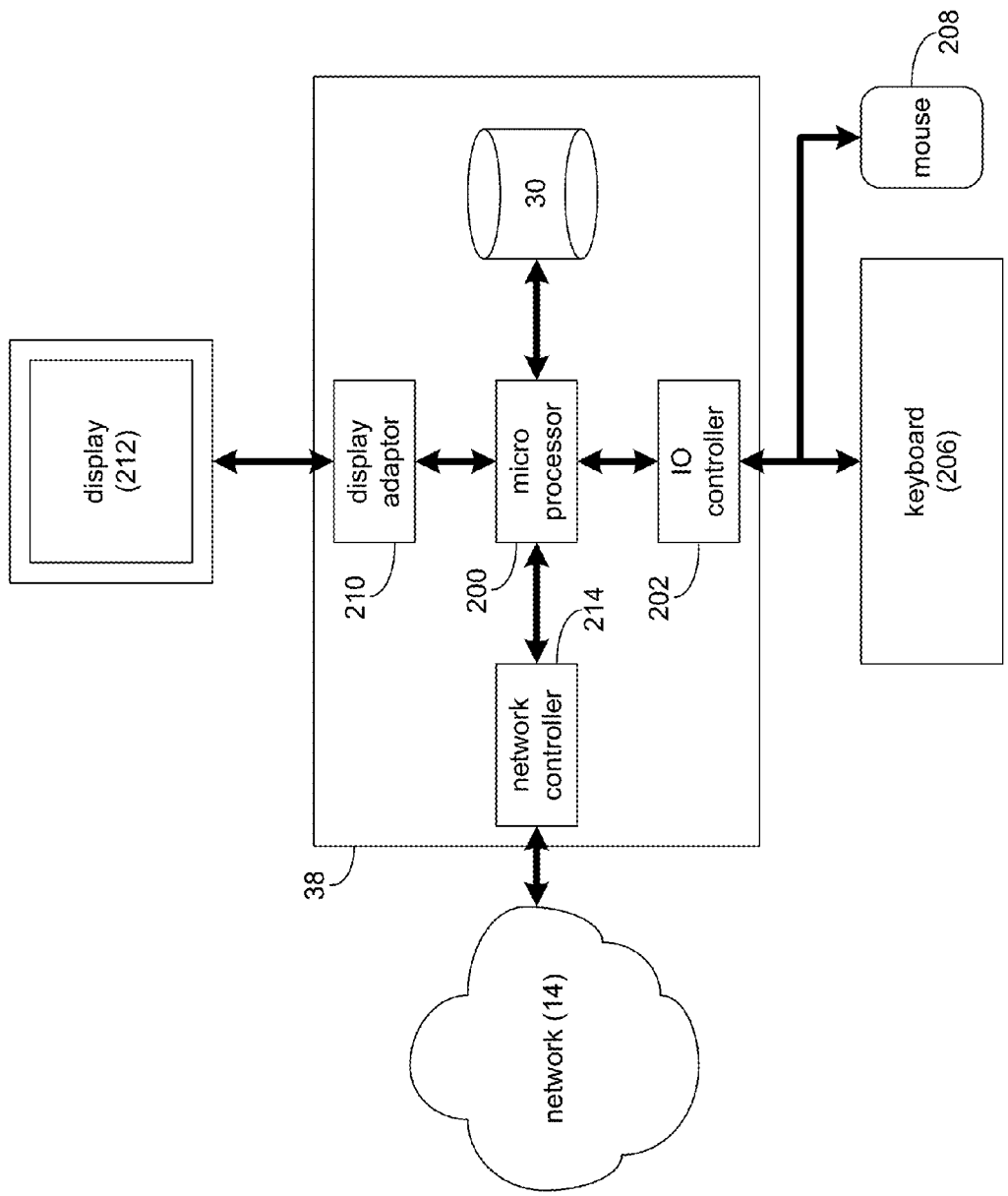
FIG. 2 is a diagrammatic view of a client electronic device of FIG. 1 according to one or more embodiments of the present disclosure.
Figure 3:
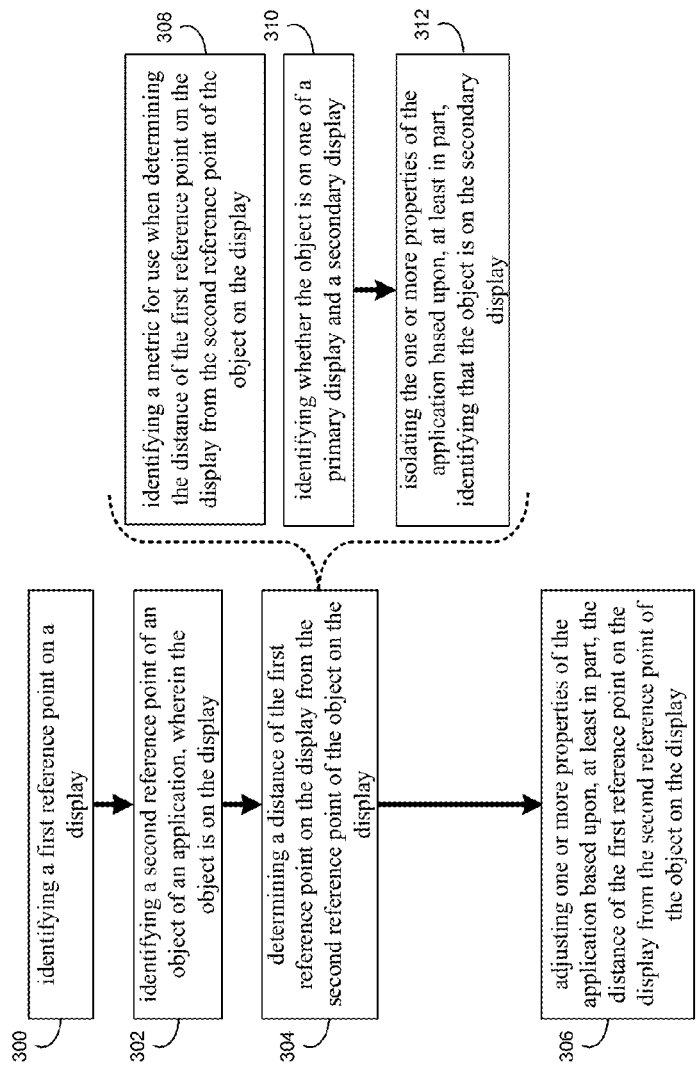
FIG. 3 is an illustrative flowchart of the adjustment process of FIG. 1 according to one or more embodiments of the present disclosure.
Figure 4:
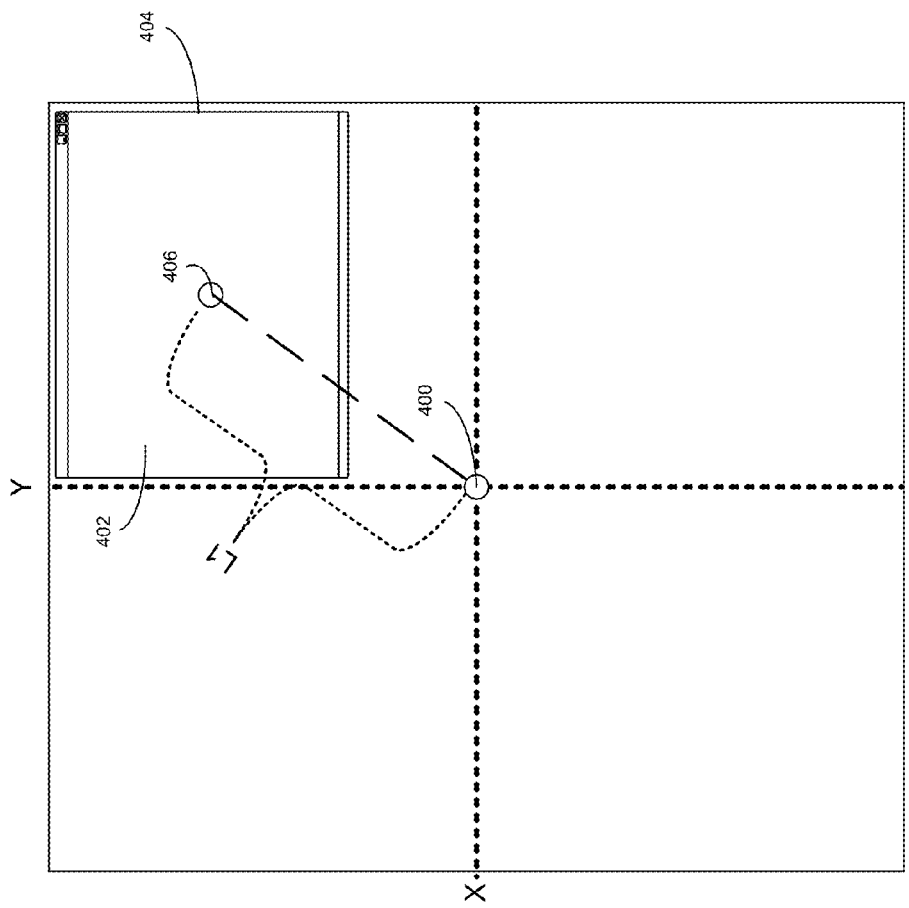
FIG. 4 is an illustrative diagrammatic view of a screen image displayed by the adjustment process of FIG. 1 according to one or more embodiments of the present disclosure.
Figure 5:
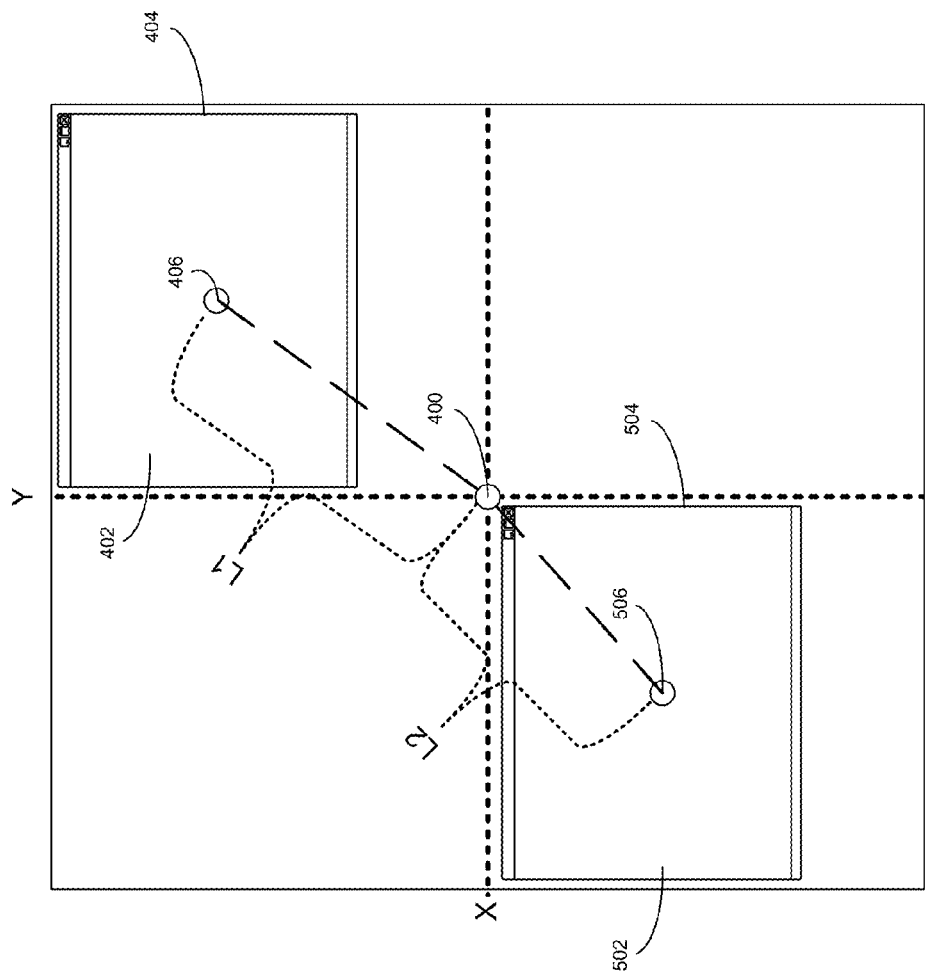
FIG. 5 is an illustrative diagrammatic view of a screen image displayed by the adjustment process of FIG. 1 according to one or more embodiments of the present disclosure.
Figure 6:
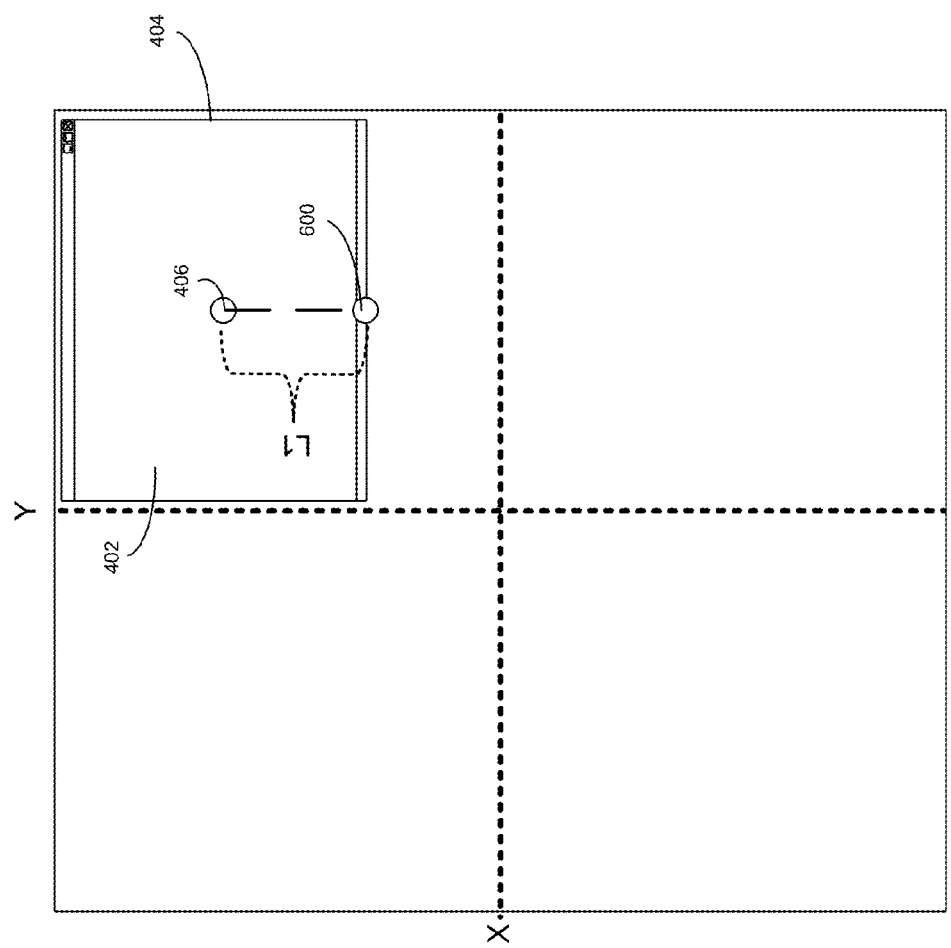
FIG. 6 is an illustrative diagrammatic view of a screen image displayed by the adjustment process of FIG. 1 according to one or more embodiments of the present disclosure.
Figure 7:
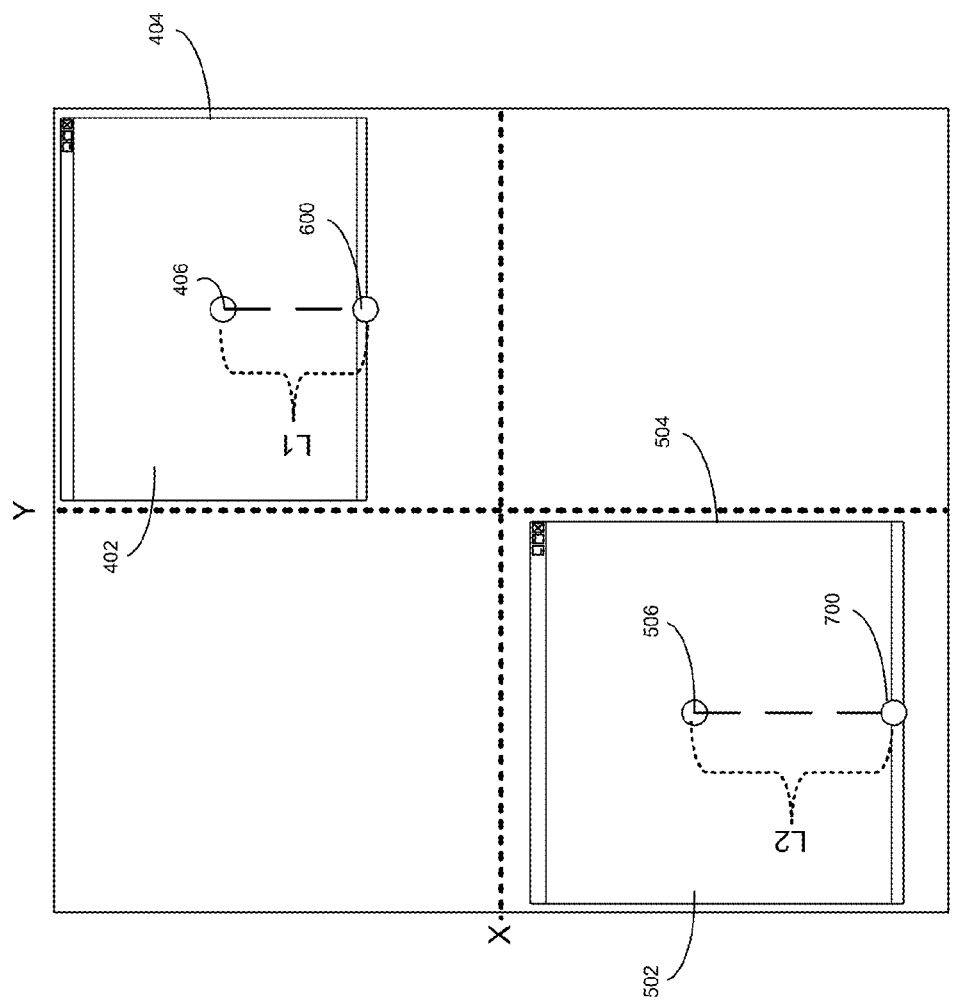
FIG. 7 is an illustrative diagrammatic view of a screen image displayed by the adjustment process of FIG. 1 according to one or more embodiments of the present disclosure.
Figure 8:
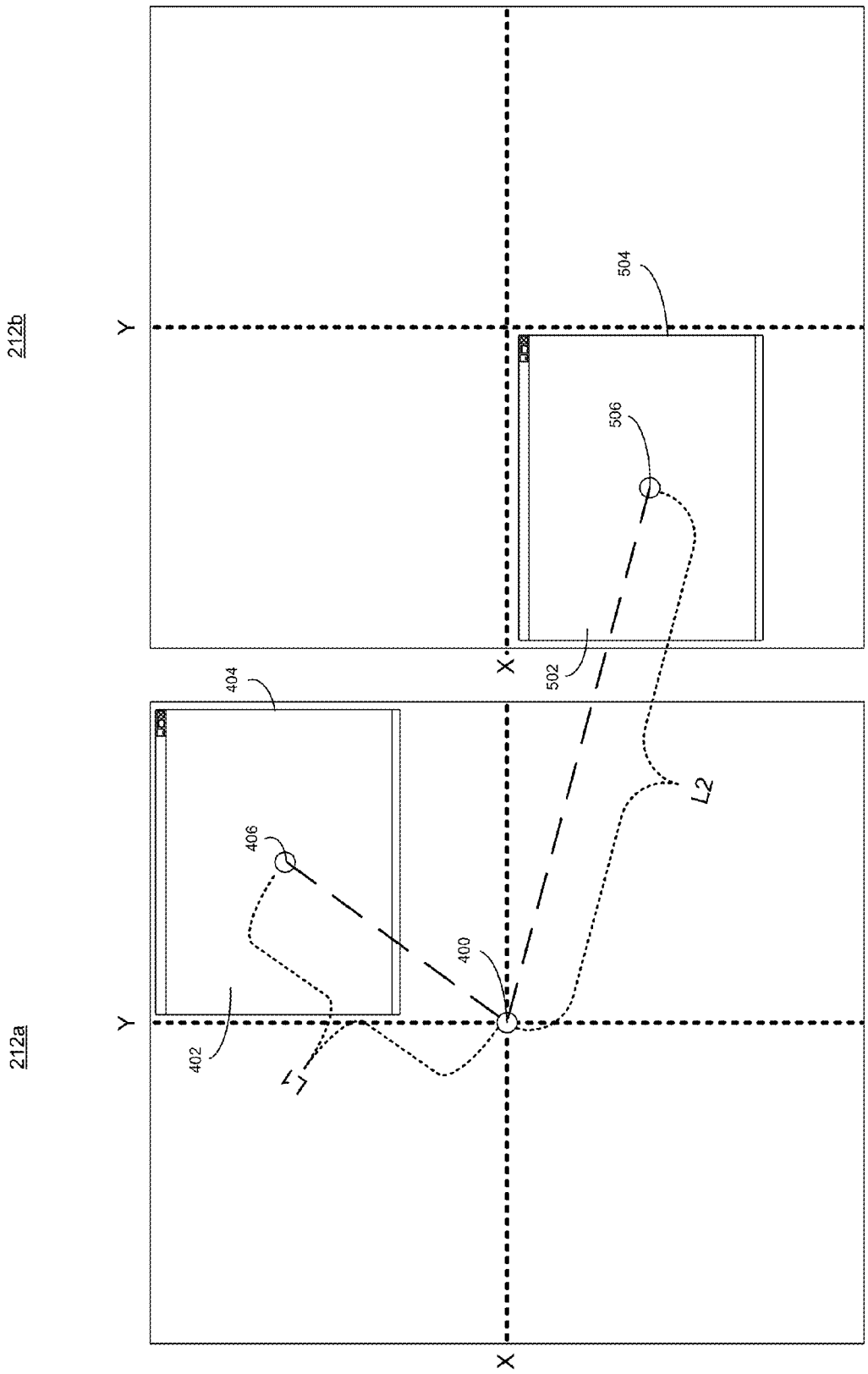
FIG. 8 is an illustrative diagrammatic view of a screen image displayed by the adjustment process of FIG. 1 according to one or more embodiments of the present disclosure.
Figure 9:
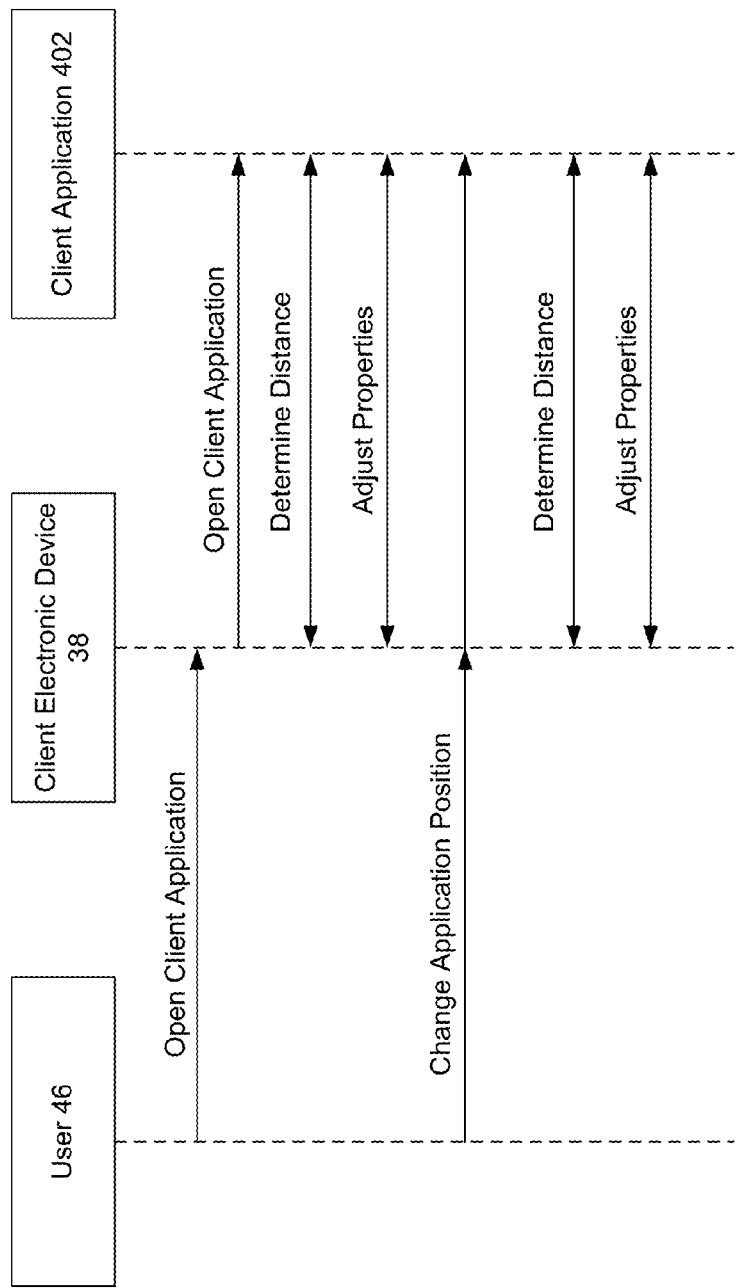
FIG. 9 is an illustrative flowchart of the adjustment process of FIG. 1 according to one or more embodiments of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configuration are possible. For example, any computing device capable of executing, in whole or in part, adjustment process 10 may be substituted for client electronic device 38 within FIG. 2, examples of which may include but are not limited to client computer 12 and client electronic devices 28, 30, 32, 34.

Client electronic device 38 may include a processor and/or microprocessor (e.g., microprocessor 200) configured to, e.g., process data and execute the above-noted code/instruction sets and subroutines of adjustment process 10. Microprocessor 200 may be coupled via a storage adaptor (not shown) to the above-noted storage device 30. An I/O controller (e.g., I/O controller 202) may be configured to couple microprocessor 200 with various devices, such as keyboard 206, pointing/selecting device (e.g., mouse 208), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Adjustment Process:

As discussed above and referring also to FIGS. 3-9, adjustment process 10 may identify 300, e.g., by a processor, a first reference point on a display. A second reference point of an object of an application may be identified 302 by adjustment process 10, wherein the object may be on the display. Adjustment process 10 may determine 304 a distance of the first reference point on the display from the second reference point of the object on the display. One or more properties of the application may be adjusted 306 by adjustment process 10 based upon, at least in part, the distance of the first reference point on the display from the second reference point of the object on the display.

For instance, assume for example purposes only that a user (e.g., user 46) is viewing display 212 via client electronic device 38. Adjustment process 10 may identify 300 a first reference point on display 212. For example, the first reference point may be the center of display 212 (e.g., display center 400). Display center 400 may be, e.g., the intersection between the x-axis and the y-axis of display 212. As used herein, reference points on the display, objects on the display and the like refer to points or objects included within a display output rendered on a display device by a computing device.

On display 212, adjustment process 10 may identify 302 a second reference point of an object of an application. For instance, further assume in the example that one or more client applications are running on client electronic device 38. One of the client applications (e.g., client application 402) may include a window (e.g., window 404) rendered in display 212. Window 404 may include, e.g., a separate window or a pop-up window. Adjustment process 10 may identify 302 a second reference point of an object (e.g., window 404) of client application 402. For example, adjustment process 10 may identify 302 the center of window 404 (i.e., window center 406) as the second reference point. Those skilled in the art will appreciate that the object need not be a window, and may be any object (e.g., an icon) and/or point capable of being identified 302 on display 212.

Adjustment process 10 may determine 304 a distance of the first reference point on display 212 from the second reference point of the object on display 212. For example, adjustment process 10 may determine 304 that the distance from display center 400 and window center 406 is L1.

One or more properties of client application 402 may be adjusted 306 by adjustment process 10 based upon, at least in part, the above-described distance L1 of the first reference point on display 212 (e.g., display center 400) from the second reference point of the object on display 212 (e.g., window center 406). For instance, assume for example purposes only that a second client application (e.g., client application 502) is also running on client electronic device 38. Client application 502 may include a window (e.g., window 504) rendered in display 212. Window 504 may include, e.g., a separate window or a pop-up window. Similarly as discussed above, adjustment process 10 may identify a (third) reference point of window 504 of client application 502. For example, adjustment process 10 may identify the center of window 504 (i.e., window center 506) as the third reference point, e.g., of client application 502. Similarly as discussed above, adjustment process 10 may determine that the distance from display center 400 and window center 506 is L2.

In the example, adjustment process 10 may compare L1 and L2 to determine whether window center 406 is closer to display center 400 or whether window center 506 is closer to display center 400. In some embodiments, because L2 is closer to display center 400 than L1, adjustment process 10 may adjust 306 the properties of client application 502 such that, e.g., at least a portion of resources (currently) allocated to client application 402 are allocated to client application 502. In some example embodiments, the allocation of resources to client application 402 may be described as, e.g., $L1/(L1+L2)$ and the allocation of resources to client application 502 may be described as, e.g., $L2/(L1+L2)$; however, the example allocation of resources is not intended to limit the scope of the disclosure as differing allocation structures are possible.

The properties adjusted 306 by adjusting process 10 may include, e.g., the allocation of system resources allocated to one or more application processes and/or other application properties, such as CPU and/or memory/storage allocation, priority/niceness, local/remote data access, visual resolution quality, volume, etc. For instance, in the above example, because L2 is closer to display center 400 than L1, adjustment process 10 may adjust 306 the properties of client application 502 such that at least some of the (currently) allocated CPU resources used by client application 402 may be allocated to client application 502. As another example, assume that client application 402 is a web browser that may be streaming video and client application 502 is a media player that may be streaming music. Because L2 is closer to display center 400 than L1, adjustment process 10 may adjust 306 the properties of client application 502 such that at least some of the volume dedicated to client application 402 is reduced and the volume dedicated to client application 502 is increased respectively.

Additionally/alternatively, the properties adjusted 306 by adjusting process 10 may include, e.g., the allocation of network resources allocated to one or more application processes and/or other application properties, such as network bandwidth, network priority, etc. For instance, continuing with the above example where client application 402 is a web browser streaming video and client application 502 is a media player that is streaming music, because L2 is closer to display center 400 than L1, adjustment process 10 may adjust 306 the properties of client application 502 such that at least some of the bandwidth being used by client application 402 is reduced and the bandwidth being used by client application 502 is increased respectively.

In some embodiments, determining 304 the distance of the first reference point on display 212 from the second reference point of the object on display 212 may include adjustment process 10 identifying 308 a metric for use when determining 304 the distance of the first reference point on display 212 from the second reference point of the object on display 212. For instance, the metric used to determine 304 the distance of display center 400 from window center 406 in one or more of the above examples may include the Euclidian distance (i.e., the "ordinary" straight line distance between two points).

In some embodiments, the metric used to determine 304 the distance of the first reference point on display 212 from the second reference point of the object on display 212 may include a z-axis of the object, such as window 404, and/or a size of window 404. For instance, assume for example purposes only that adjustment process 10 identifies 300 the first reference point on display 212 as another location on window 404, such as window bottom center 600. In the example, the distance L1 between window bottom center 600 and the second reference point (e.g., window center 406) may be dependent upon the size of window 404. Further in the example, assume that user 46 uses, e.g., mouse 208, to shrink the size of window 404. As such, the distance L1 between window bottom center 600 and window center 406 may decrease, which may result in adjustment process 10 adjusting 306 the properties of client application 402. For instance, in the above example where client application 402 is a web browser that may be streaming video, adjustment process 10 may adjust 306 the properties of client application 502 such that at least some of the volume dedicated to client application 402 may be reduced as the distance L1 between window bottom center 600 and window center 406 decreases. Conversely, adjustment process 10 may adjust 306 the properties of client application 502 such that at least some of the volume dedicated to client application 402 may be increased as the distance L1 between window bottom center 600 and window center 406 increases.

In some embodiments, and continuing with the above example where client application 402 is a web browser that may be streaming video and client application 502 is a media player that may be streaming music, further assume for example purposes only that adjustment process 10 identifies 300 a third reference point on display 212 as another location on window 504, such as window bottom center 700. Thus, the distance between window center 506 and window bottom center 700 is L2. Adjustment process 10 may compare L1 and L2. Because L2 is longer than L1, adjustment process 10 may adjust 306 the properties of client application 502 such that at least some of the volume dedicated to client application 402 is reduced and the volume dedicated to client application 502 is increased respectively.

In some embodiments, the metric used to determine 304 the distance of the first reference point on display 212 from the second reference point of the object on display 212 may include a visibility of the object. For example, and continuing with the above example where client application 402 is a web browser that may be streaming video and client application 502 is a media player that may be streaming music, according to some of the above embodiments, because L2 may be closer to display center 400 than L1, adjustment process 10 may adjust 306 the properties of client application 502 such that at least some of the (currently) allocated CPU resources used by client application 402 may be allocated to client application 502. However, further assume for example purposes only that user 46 uses mouse 208 to move window 402 such that window 402 obstructs at least a portion of window 502 from being seen by user 46. In the example, even though L2 may be closer to display center 400 than L1, because window 402 obstructs at least a portion of window 502 from being seen by user 46, adjustment process 10 may adjust 306 the properties of client application 502 such that at least some of the volume dedicated to client application 502 is reduced and the volume dedicated to client application 402 is increased respectively. Additionally/alternatively, any cause of the obstruction of window 502 (e.g., "minimizing" window 502) may similarly result in at least some of the volume dedicated to client application 502 being reduced and the volume dedicated to client application 402 being increased respectively.

In some embodiments, the metric used to determine 304 the distance of the first reference point on display 212 from the second reference point of the object on display 212 may include a virtual distance. For instance, assume for example purposes only that display 212 includes at least two different monitors, e.g., a primary display 212a and a secondary display 212b. Further assume that user 46, e.g., via adjustment process 10, has defined the priority of primary display 212a as the primary monitor and defined the priority of secondary display 212b as the secondary monitor. In some example embodiments, the allocation of resources to client application 402 may be described as, e.g., $L1/(L1+P*L2)$ and the allocation of resources to client application 502 may be described as, e.g., $P*L2/(L1+P*L2)$ where P is the secondary screen priority. If P is smaller than 1, the secondary screen priorities may be decreased. The example allocation of resources is not intended to limit the scope of the disclosure as differing allocation structures are possible.

In the example, determining 304 the distance of the first reference point on display from the second reference point of the object on the display may include adjustment process 10 identifying 310 whether the object is on one of primary display 212a and secondary display 212b. For example, adjustment process 10 may identify 310 that window 404 is displayed on primary display 212a. As such, similarly to some of the above examples, adjustment process 10 may determine 304 that the distance from display center 400 and window center 406 is L1. Continuing with the example, adjustment process 10 may identify 310 that window 504 is displayed on secondary display 212b. In some embodiments, adjustment process 10 may determine 304 that the distance from display center 400 and window center 506 is a "virtual" distance of L2. Adjustment process 10 may compare L1 and L2 and may adjust 306 the properties of client application 402 and/or client application 502 in a similar manner as discussed above.

In some embodiments, adjustment process 10 may isolate 312 one or more properties of the application based upon, at least in part, identifying 310 that the object is on the secondary display. For example, and continuing with the above example where adjustment process 10 identifies 310 that window 504 is displayed on secondary display 212b, adjustment process 10 may, e.g., set P=0 for the secondary screen priority, to create an isolated area and to isolate 312 the properties of client application 502. For instance, adjustment process 10 may partially or completely reduce the properties allocated to client application 502 when adjustment process 10 identifies 310 that window 504 is on secondary display 212b. Conversely, adjustment process 10 may partially or completely reduce the properties allocated to client application 402 when adjustment process 10 identifies 310 that window 404 is on secondary display 212b.

While the first reference point has been described as the center of display 212 (i.e., center display 400), those skilled in the art will appreciate that the first reference point may be any location on display 212. For example, the first reference point may be, e.g., in the upper left quadrant of display 212. Furthermore, the first reference point may include another object on display 212. For example, the first reference point may include at least a portion of window 404 or may include at least a portion of window 504. As such, the description of the first reference point being center display 400 should be taken as an example only and not to limit the scope of the disclosure.

While the present disclosure is described using two client applications 402/502, those skilled in the art will appreciate that any number of client applications (as well as applications transparent to the user) may also be taken into consideration when adjusting 306 application properties. Moreover, more than one client application need not be running simultaneously to implement the present disclosure. For instance, using one of the above examples, where client application 402 may be a web browser streaming video, the volume level of client application 402 may be adjusted 306 by adjustment process 10 such that as L1 becomes smaller, the volume level may be increased, and as L1 becomes larger, the volume level may be decreased. Therefore, the description of using two client applications should be taken as an example only and not to limit the scope of the disclosure.

The properties that may be adjusted 306 by adjustment process 10, how the properties are adjusted and how much the properties may be adjusted may be based, at least in part, on default settings or user specified settings.

Those skilled in the art will appreciate that adjustment process 10 may interact with a kernel one of the above-noted operating system operating on client electronic device 38 to adjust 306 properties. Adjustment process 10 may also, e.g., issue system commands and/or interact with an Application Programming Interface (API) of each respective client application to adjust 306 properties. Those skilled in the art will also appreciate that adjustment process 10 may adjust 306 properties "on the fly" when, e.g., either client application 402 and/or 502 is initially opened, and/or when either window 404 and/or 504 changes (e.g., position). An example of this may be shown in FIG. 9. Additionally/alternatively, user 46 via adjustment process 10 may adjust 306 properties in response to user 46 initiating the adjustment 306 (e.g., via a user interface (not shown)) after either window 404 and/or 504 has changed position.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The embodiment(s) were chosen and described in order to best explain the principles of the disclosure and the practical application, and to enable others of ordinary skill in the art to understand the disclosure for various embodiment(s) with various modifications and/or any combinations of embodiment(s) as are suited to the particular use contemplated.

Having thus described the disclosure of the present application in detail and by reference to embodiment(s) thereof, it will be apparent that modifications, variations, and any combinations of embodiment(s) (including any modifications, variations, and combinations thereof) are possible without departing from the scope of the disclosure defined in the appended claims.

What is claimed is:

1. A computer program product residing on a non-transitory computer readable storage medium having a plurality of instructions stored thereon which, when executed by a processor, cause the processor to perform operations comprising:
   identifying a first reference point on a display;
   identifying a second reference point of an object of an application, wherein the object is on the display;
   identifying a third reference point of a second object of a second application, wherein the second object is on the display;
   determining a distance of the first reference point on the display from the second reference point of the object on the display;
   determining a second distance of the first reference point on the display from the third reference point of the second object on the display; and
   adjusting one or more properties of the application based upon, at least in part, the distance of the first reference point on the display from the second reference point of the object on the display and the second distance of the first reference point on the display from the second reference point of the second object on the display.

2. The computer program product of claim 1 wherein the one or more adjusted properties of the application include at least one of system resources and network resources.

3. The computer program product of claim 1 wherein determining the distance of the first reference point on the display from the second reference point of the object on the display includes identifying a metric for use when determining the distance of the first reference point on the display from the second reference point of the object on the display.

4. The computer program product of claim 3 wherein the metric includes at least one of a Euclidian distance, a virtual distance, a size of the object, a z-axis of the object, and a visibility of the object.

5. The computer program product of claim 1 wherein the first reference point includes another object on the display.

6. The computer program product of claim 1 wherein the display includes at least a primary display and secondary display, and wherein determining the distance of the first reference point on the display from the second reference point of the object on the display includes identifying whether the object is on one of the primary display and the secondary display.

7. The computer program product of claim 6 wherein the operations further comprise isolating the one or more properties of the application based upon, at least in part, identifying that the object is on the secondary display.

8. A computing system including:
   a processor and a memory configured to perform operations comprising:
      identifying a first reference point on a display;
      identifying a second reference point of an object of an application, wherein the object is on the display;
      identifying a third reference point of a second object of a second application, wherein the second object is on the display;

determining a distance of the first reference point on the display from the second reference point of the object on the display;

determining a second distance of the first reference point on the display from the third reference point of the second object on the display; and adjusting one or more properties of the application based upon, at least in part, the distance of the first reference point on the display from the second reference point of the object on the display and the second distance of the first reference point on the display from the second reference point of the second object on the display.

9. The computing system of claim 8 wherein the one or more adjusted properties of the application include at least one of system resources and network resources.

10. The computing system of claim 8 wherein determining the distance of the first reference point on the display from the second reference point of the object on the display includes identifying a metric for use when determining the distance of the first reference point on the display from the second reference point of the object on the display.

11. The computing system of claim 10 wherein the metric includes at least one of a Euclidian distance, a virtual distance, a size of the object, a z-axis of the object, and a visibility of the object.

12. The computing system of claim 8 wherein the first reference point includes another object on the display.

13. The computing system of claim 8 wherein the display includes at least a primary display and secondary display, and wherein determining the distance of the first reference point on the display from the second reference point of the object on the display includes identifying whether the object is on one of the primary display and the secondary display.

14. The computing system of claim 13 wherein the operations further comprise isolating the one or more properties of the application based upon, at least in part, identifying that the object is on the secondary display.

* * * * *